United States Patent [19]

Aoki

[11] 4,379,206
[45] Apr. 5, 1983

[54] MONITORING CIRCUIT FOR A DESCRAMBLING DEVICE

[75] Inventor: Shinichiro Aoki, Sagamihara, Japan

[73] Assignee: Fujitsu Limited, Kawasaki, Japan

[21] Appl. No.: 188,261

[22] Filed: Sep. 17, 1980

[51] Int. Cl.³ .................. H04L 9/00; G06F 11/08
[52] U.S. Cl. .................... 178/22.13; 178/22.16; 178/22.17; 371/68; 370/107
[58] Field of Search .............. 178/22.13–22.16, 178/22.17; 375/114–116, 1, 108; 370/107; 371/68

[56] References Cited

U.S. PATENT DOCUMENTS

| 3,439,279 | 4/1969 | Guanella | 178/22.17 |
| 3,471,686 | 10/1969 | Connell | 371/68 |
| 3,517,174 | 6/1970 | Ossfeldt | 371/68 |
| 3,659,046 | 4/1972 | Angeleri et al. | 178/22.17 |
| 3,931,505 | 1/1976 | Sevcik | 371/68 |
| 4,133,974 | 1/1979 | Morgan | 178/22.17 |
| 4,169,212 | 9/1979 | Kinch, Jr. | 178/22.17 |
| 4,251,873 | 2/1981 | Joby | 371/68 |

Primary Examiner—Sal Cangialosi
Attorney, Agent, or Firm—Staas & Halsey

[57] ABSTRACT

A monitoring circuit for a descrambling device where one or more scrambled digital signals are descrambled by a first pseudo noise sequence generator which is triggered by a codeword detector. The monitoring circuit comprises a second pseudo noise sequence generator which is triggered by the codeword detector, a discriminator for discriminating between the two signals output by the first and second pseudo noise generators, a gate circuit for transmitting the output signal of the discriminator for a predetermined time and a monitoring signal generator for converting the output signal of the gate circuit into a monitoring signal.

12 Claims, 14 Drawing Figures

MONITORING CIRCUIT FOR A DESCRAMBLING DEVICE

BACKGROUND OF THE INVENTION (1) Field of the Invention

The present invention relates generally to a time division multiple access system (hereinafter referred to as a TDMA system) and, more particularly, to a monitoring circuit for a descrambling device in a receiving terminal for the TDMA system.

(2) Description of the Prior Art

In general, in a transmitting terminal of a TDMA system, data to be transmitted is scrambled by using a pseudo noise sequence so that the energy of the transmitted data can be prevented from being concentrated in a specific region of the frequency spectrum. In addition, a clock signal can be effectively restored in the receiving terminal. That is, data to be transmitted is exclusive-ORed with the pseudo noise sequence and the resultant signal modulates an IF carrier.

In the receiving terminal, it is necessary to remove the pseudo noise sequence which is used for scrambling, from the received data. Therefore, after the received data is demodulated, the data is descrambled by using the same pseudo noise sequence used in the transmitting terminal, so that the original data is restored.

The transmitting terminal has a pseudo noise generator for generating a pseudo noise sequence for scrambling, while the receiving terminal has a pseudo noise generator for generating a pseudo noise sequence for descrambling. For normal operation of the TDMA system, it is necessary to monitor the descrambling device. It is difficult to monitor the sequence (periodicity) of the pseudo noise sequence generated by the pseudo noise sequence generator of the descrambling device, because the generator is initialized every time burst signals are received.

A conventional monitoring circuit for a descrambling device comprises a retriggerable monostable multivibrator for detecting an output signal of the pseudo noise sequence generator. As a result, whether or not the pseudo noise sequence generator is operated can be determined. However, in the conventional monitoring circuit, whether or not a pseudo noise sequence generated by the pseudo noise sequence generator is correct cannot be determined.

SUMMARY OF THE INVENTION

It is a principal object of the present invention to provide a monitoring circuit for a descrambling device, capable of monitoring the accuracy of the sequence of a pseudo noise sequence signal generated by the descrambling device.

According to the present invention, there is provided a monitoring circuit for a descrambling device where at least one received digital signal is descrambled by a main pseudo noise sequence signal generated by a main pseudo noise sequence generator. The descrambling is triggered by a codeword detector for detecting a predetermined codeword in the received digital signal. An additional pseudo noise sequence generator is connected to the codeword detector, for generating an additional pseudo noise sequence signal when triggered by the codeword detector. The electrical structures of the main and additional pseudo noise generators are the same. A discriminator is connected to the main and additional pseudo noise sequence generators, for discriminating between the main and additional pseudo noise sequence signals and generating a pulse-shaped signal when the main and additional pseudo noise sequence signals are different. A gate means is connected to the codeword detector and the discriminator, for transmitting the pulse-shaped signal therethrough for a predetermined time after the gate means is triggered by the codeword detector. A monitoring signal generator is connected to the gate means, for converting the pulse-shaped signal transmitted from the gate means into a monitoring signal.

The present invention will be more clearly understood from the description as set forth below contrasting the present invention with a conventional circuit and with reference to the accompanying drawings.

DESCRIPTION OF THE PREFERRED EMBODIMENT

Figure 1A:
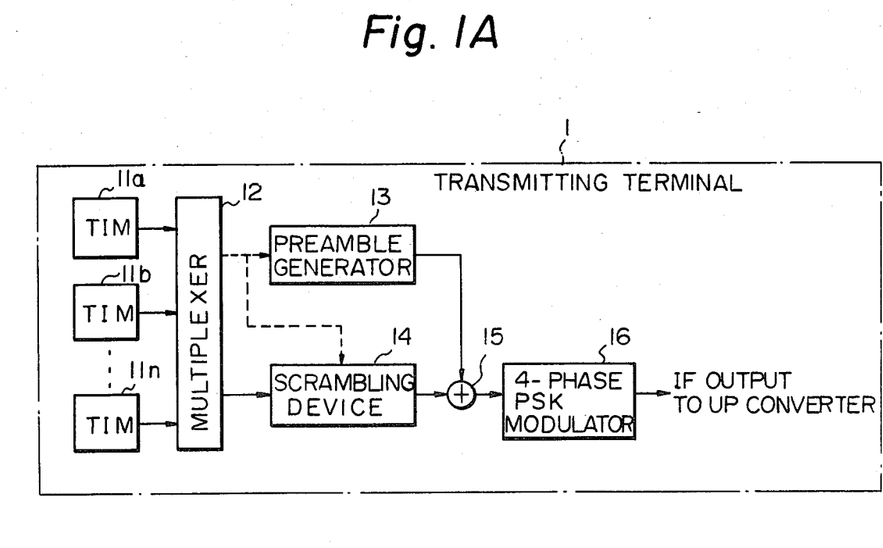
FIGS. 1A and 1B are block diagrams of transmitting and receiving terminals, respectively, for a general TDMA system.

In FIG. 1A which illustrates a transmitting terminal 1 for a general TDMA system, terrestrial interface modules (TIMs) 11a, 11b, . . . 11n are connected to a multiplexer 12 which provides control signals to a preamble generator 13 and a scrambling device 14 which receives a data signal from the multiplexer 12. Output signals from the preamble generator 13 and the scrambling device 14 are added by an adder 15 and transmitted to a four-phase phase shift keying (PSK) modulator 16 which generates an IF output signal and provides the IF output signal to an up converter.

Figure 1B:
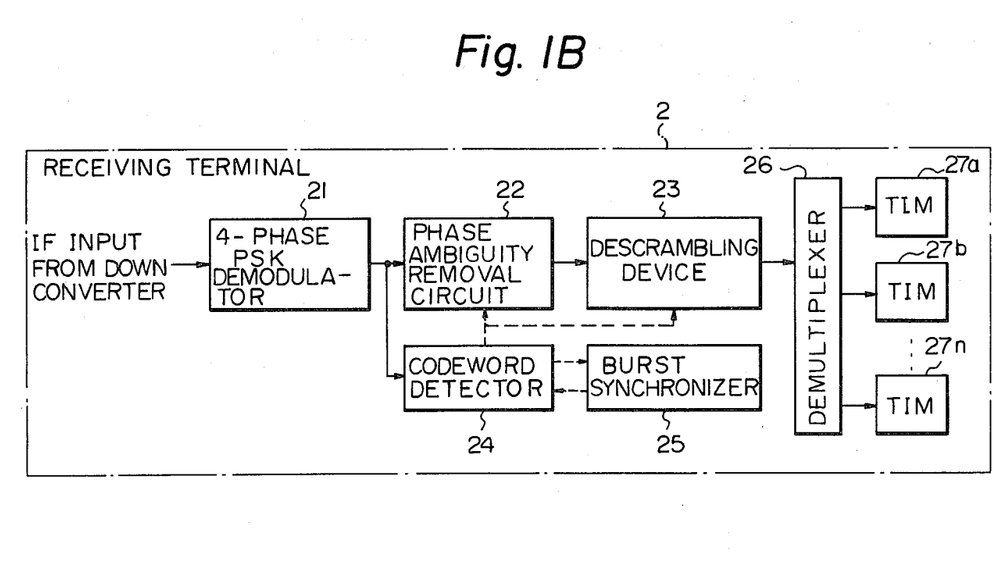

Referring to FIG. 1B which illustrates a receiving terminal 2 for a general TDMA system, a four-phase PSK demodulator 21 receives an IF input signal from a down converter and generates a four-phase PSK demodulated signal which is sent to a phase ambiguity removal circuit 22. The ambiguity removal circuit 22 is connected to a descrambling device 23, and to a codeword detector 24 which is controlled by a burst synchronizer 25. The phase ambiguity removal circuit 22 and the descrambling device 23 are controlled by the codeword detector 24. The descrambling device 23 is connected to a demultiplexer 26 which, in turn, is connected to terrestrial interface modules (TIMs) 27a, 27b, . . . , 27n. Usually, the PSK demodulator 21 incorporates a clock restoring circuit and a carrier restoring circuit therein. In FIGS. 1A and 1B, connections by solid lines show main signal paths, while connections by dotted lines show main control lines.

Figure 2:
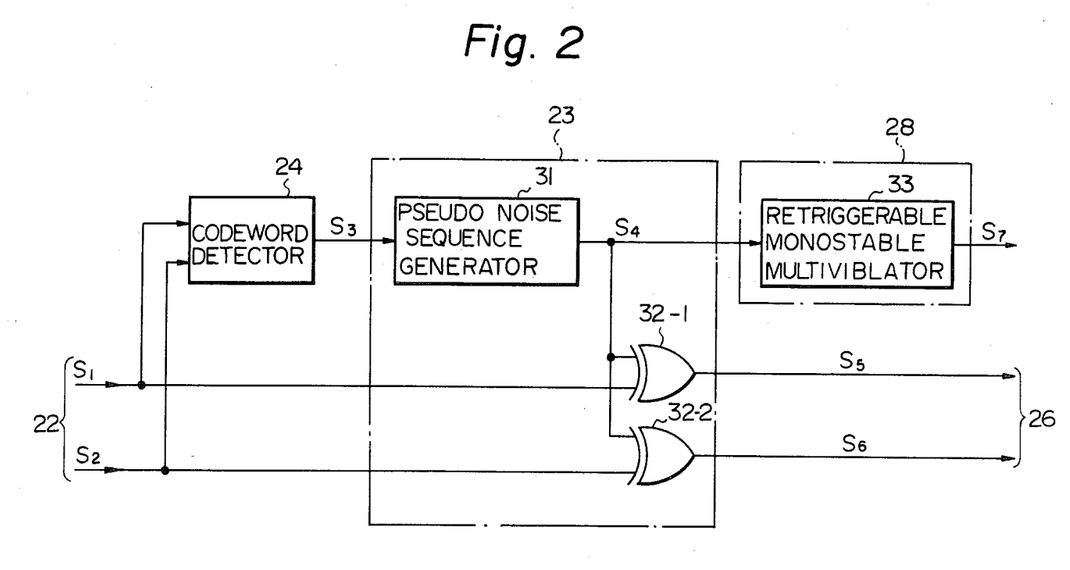
FIG. 2 is a block diagram illustrating a conventional monitoring circuit for a descrambling device.

FIG. 2 is a block diagram illustrating a conventional monitoring circuit for a descrambling device. In FIG. 2, a monitoring circuit 28 comprises a retriggerable monostable multivibrator 33 which generates a monitoring signal $S_7$ used for monitoring the descrambling device 23. The descrambling device 23 comprises a pseudo noise sequence generator 31 and exclusive-OR gates 32-1 and 32-2. When the codeword detector 24 detects the desired codewords in signals $S_1$ and $S_2$ from the demodulator 21, the detector 24 generates a trigger signal $S_3$ and sends it to the pseudo noise sequence generator 31 which, in turn, generates a pseudo noise sequence signal $S_4$. As a result, the signals $S_1$ and $S_2$ are converted into the data signals $S_5$ and $S_6$ by the exclusive-OR gates 32-1 and 32-2, respectively, which receive the pseudo noise sequence signal $S_4$. It should be noted that the sequence of the pseudo noise sequence signal $S_4$ must be the same as that of the pseudo noise sequence signal of the scrambling device 14 at the transmitting terminal 1 (FIG. 1). Therefore, the electrical structure of the pseudo noise sequence generator 31 is the same as that of the pseudo noise sequence generator of the scrambling device 14 of the transmitting terminal 1. The retriggerable monostable multivibrator 33 monitors whether or not the pseudo noise sequence generator 31 is operating, but can not monitor whether or not the sequence of the pseudo noise sequence signal $S_4$ is correct.

Contrary to the above described device, in the present invention, the sequence of the pseudo noise sequence signal $S_4$ can be monitored for accuracy.

Figure 3:
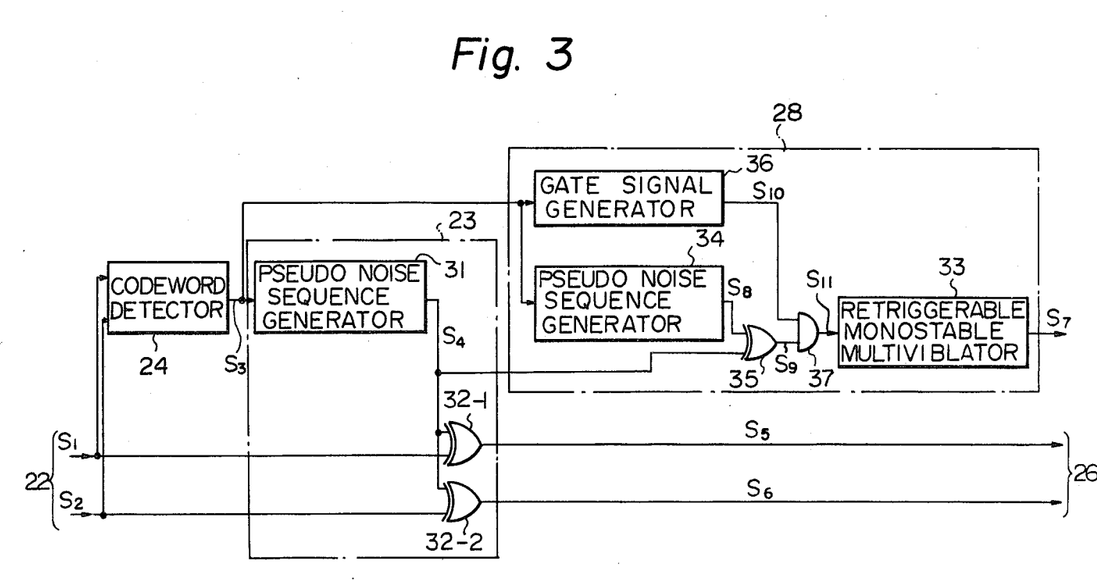
FIG. 3 is a block diagram illustrating an embodiment of the monitoring circuit for a descrambling device according to the present invention.

FIG. 3 is a block diagram illustrating an embodiment of the monitoring circuit for a descrambling device according to the present invention. In FIG. 3, the elements which are the same as those of FIG. 2 are denoted by the same reference numerals. That is, in FIG. 3, elements 34, 35, 36 and 37 are added to FIG. 2. A pseudo noise sequence generator 34, having the same electrical structure as the pseudo noise sequence generator 31, is triggered at the same time the pseudo noise sequence generator 31 is triggered by the codeword detector 24. An exclusive-OR gate 35, which serves as a discriminator, is used for discriminating between the sequences of the two pseudo noise sequence signals $S_4$ and $S_8$. A gate signal generator 36 and an AND gate 37 serve as a gate means for transmitting the output signal $S_9$ of the exclusive-OR gate 35 to the retriggerable monostable multivibrator 33. The gate signal generator 36 is also triggered by the codeword detector 24 and generates a rectangular signal $S_{10}$ having a predetermined time-length, so that the signal $S_9$ is transmitted through the gate 37 for a predetermined time-length.

Figures 4A, 4B, 4C:
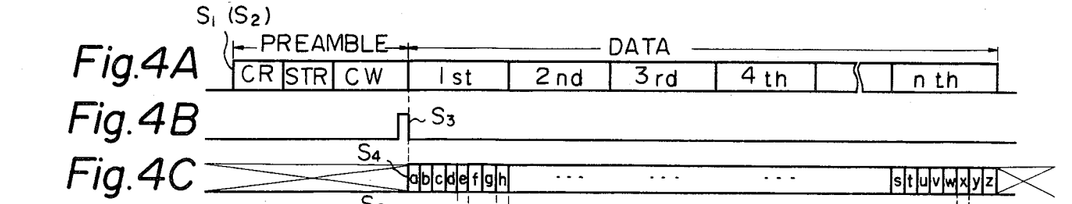
FIGS. 4A through 4H are timing diagrams for the signals appearing in the circuit of FIG. 3.

FIGS. 4A through 4H are timing diagrams of the signals appearing in the circuit of FIG. 3. Referring to FIGS. 4A through 4H, the operation of the circuit of FIG. 3 will now be explained. As illustrated in FIG. 4A, the digital signal $S_1$ (or $S_2$) comprises a preamble portion and a data portion. In more detail, the preamble portion includes a carrier recovery synchronization pattern CR, such as "00...0" or "1 1...1", for activating the carrier restoring circuit included in the demodulator 21 (FIG. 1B); a symbol time recovery synchronization pattern STR, such as "1010...10", for activating the clock restoring circuit included in the demodulator 21; and a codeword CW which will be detected by the codeword detector 24. The data portion includes a plurality of data channels, such as 1st, 2nd, 3rd,-, n-th data channels.

Figure 4D:
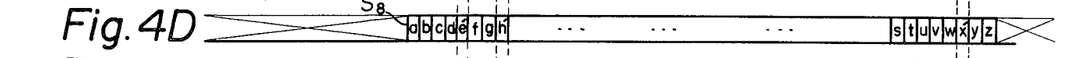
Figure 4E:
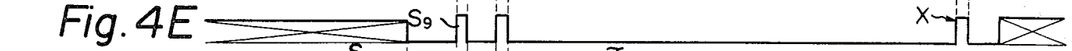

When the codeword detector 24 detects the codeword CW, as illustrated in FIG. 4A, the detector 24 generates a pulse-shaped trigger signal $S_3$, as illustrated in FIG. 4B, which triggers the pseudo noise sequence generators 31 and 34, and the gate signal generator 36. As a result, the pseudo noise sequence generators 31 and 34 generate pseudo noise sequence signals $S_4$ and $S_8$, respectively, as illustrated in FIGS. 4C and 4D. In the normal state, the sequences of the signals $S_4$ and $S_8$ are the same during burst periods. In the abnormal state, when the sequence of the signal $S_4$ is different from that of the signal $S_8$, as illustrated in FIGS. 4C and 4D, the exclusive-OR gate 35 generates a pulse-shaped signal $S_9$, as illustrated in FIG. 4E. However, during any burst period of a TDMA frame the restored clock signals restored by the demodulator 21 are not necessarily present. Therefore, in this case, differences between the pseudo noise sequence signals $S_4$ and $S_8$ may be generated so that the gate 35 produces a false signal.

It should be noted that the number of data channels in one data portion in FIG. 4A is defined to be larger than a predetermined number which is, in this case, four. Therefore, in FIG. 4E, a time-length $\tau_1$ of the signal $S_{10}$, generated by the gate signal generator 36, corresponds to four data channels which is a minimum burst time-length. Thus, during any burst period, the false signal is inhibited by the output signal $S_{10}$ of the gate signal generator 36. Therefore, the malfunction of the reriggerable monostable multivibrator 33 can be avoided.

Figures 4F, 4G:
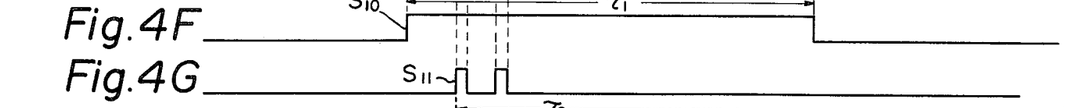
Figure 4H:
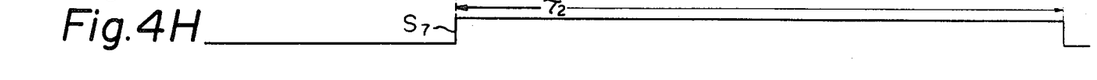

Next, the AND gate 37 generates a signal $S_{11}$, as illustrated in FIG. 4G, which is similar to the signal $S_9$, except for the waveform indicated by an arrow X. The signal $S_{11}$ triggers the retriggerable monostable multivibrator 33, which, in turn, generates a rectangular wave signal $S_7$ where its time-length $\tau_2$ is relatively long. For example, the time-length $\tau_2$ is longer than one TDMA data frame period. Therefore, the signal $S_7$ serves as a stationary monitoring signal. Thus, the sequence of the pseudo noise sequence signal $S_4$ can be monitored. Of course, the presence of the pseudo noise sequence signal $S_4$ can also be monitored, because when the signal $S_4$ disappears, the exclusive-OR gate 35 generates a large number of pulse-shaped waves.

Figure 5:
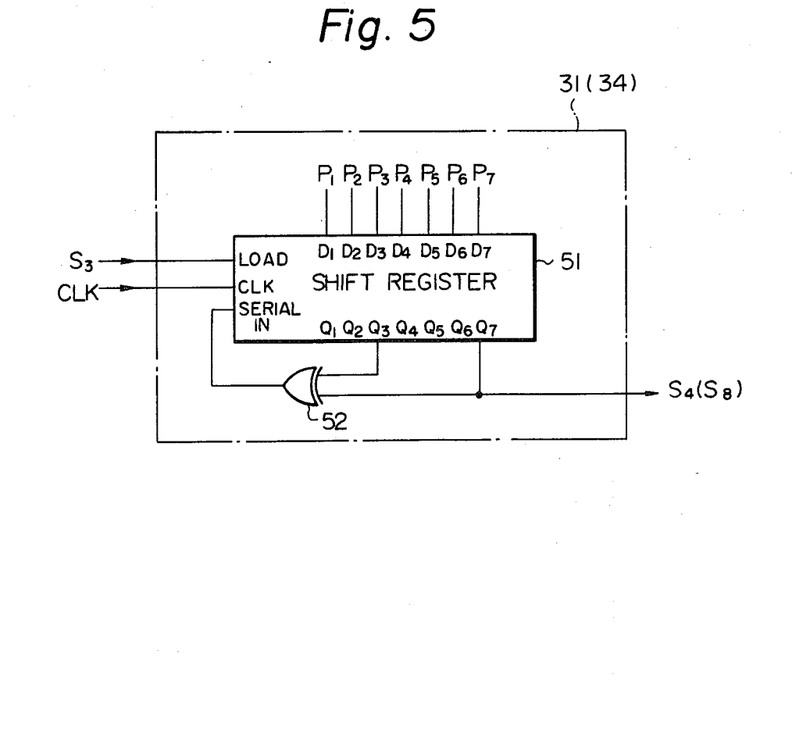
FIG. 5 is a logic circuit diagram of the pseudo noise generator 31 (34) of FIG. 3.

FIG. 5 is a logic circuit diagram for the pseudo noise sequence generator 31 (or 34) of FIG. 3. The generator 31 comprises a shift register 51 and an exclusive-OR gate 52. In this diagram, the period of the pseudo noise sequence signal $S_4$ (or $S_8$) is 127 ($=2^7-1$) clock periods. When the generator 31 receives a trigger signal $S_3$ from the codeword detector 24, the initial data is loaded in the shift register 51. In this case, the initial data is predetermined by applying potentials to program terminals $P_1, P_2,-, P_7$. A clock signal CLK is supplied by the clock restoring circuit of the demodulator 21. It should be noted that FIG. 5 also indicates a logic circuit diagram of the pseudo noise sequence generator for the scrambling device 14 of the transmitting terminal 1 of FIG. 1A.

Figure 6:
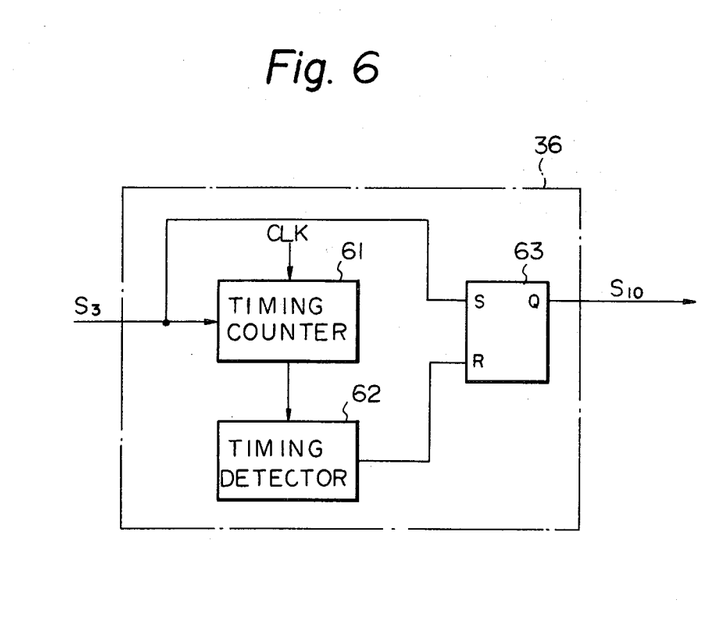
FIG. 6 is a block diagram of the gate signal generator 36 of FIG. 3.

FIG. 6 is a block diagram of the gate signal generator 36 of FIG. 3. The gate signal generator 36 comprises a timing counter 61, an timing detector 62 and a RS flip-flop 63. When the generator 36 receives a trigger signal $S_3$ from the codeword detector 24 (FIG. 3), the timing counter 61 begins to count the clock signals CLK from the clock restoring circuit and, simultaneously, the flip-flop 63 is set so that the potential of the signal $S_{10}$ rises to a first level. After a predetermined time $\tau_1$ passes, the timing detector 62 resets the flip-flop 63 so that the potential of the signal $S_{10}$ drops to a second level. Thus, the gate signal $S_{10}$, as illustrated in FIG. 4F, is generated by the gate signal generator 36.

As explained hereinbefore, the monitoring circuit for a descrambling device according to the present invention has the advantage, as compared with conventional circuits, that the sequence of the pseudo noise sequence can be monitored for accuracy.

I claim:

1. A monitoring circuit, operatively connected to a codeword detector which generates a codeword detector signal upon the detection of a predetermined codeword in a received signal, and operatively connected to a first pseudo noise sequence generator which generates a first pseudo noise sequence signal, for a descrambling device where at least one received signal is descrambled by the first pseudo noise sequence signal, and wherein the first pseudo noise sequence generator is triggered by the codeword detector signal, comprising:

a second pseudo noise sequence generator, operatively connected to the codeword detector, for generating a second pseudo noise sequence signal when triggered by the codeword detector signal received from the codeword detector, the electrical structures of the first pseudo noise sequence generator and said second pseudo noise sequence generator being equivalent;

a discriminator, having first and second inputs operatively connected to the first pseudo noise sequence generator and said second pseudo noise sequence generator, respectively, for discriminating between the first and second pseudo noise sequence signals, and for generating a pulse-shaped signal when the first and second pseudo noise sequence signals are different;

gate means, having first and second inputs operatively connected to the codeword detector and said discriminator, respectively, for transmitting the pulse-shaped signal received from said discriminator therethrough for a first predetermined time period after said gate means is triggered by the codeword detector signal said gate means comprising:

a gate signal generator, having an input operatively connected to the codeword detector, and having an output, for generating a gate signal, wherein the time-period of the gate signal is the first predetermined time period, after said gate signal generator is triggered by the codeword detector signal; and an AND gate having first and second inputs operatively connected to the output of said gate signal generator and said discriminator, respectively, and having an output; and a monitoring signal generator, operatively connected to the output of said AND gate, for converting the pulse-shaped signal transmitted from said gate means into a monitoring signal.

2. A monitoring circuit according to claim 1, wherein said predetermined time period is equal to a minimum burst time-length which is the length of time necessary for receipt of four data channel signals.

3. A monitoring circuit according to claim 1, wherein said gate signal generator is operatively connected to receive clock pulses, wherein said gate signal generator comprises:

a timing counter, having a trigger input operatively connected to the codeword detector, having a clock input, and having an output, for counting clock pulses, and for generating a count signal when said timing counter counts a predetermined number of the clock pulses, said timing counter counting being triggered by the codeword detector signal;

a timing detector, having an input operatively connected to the output of said timing counter, and having an output, for generating a reset pulse when the count signal is received; and a flip-flop having a set input and a reset input operatively connected to the codeword detector and the output of said timing detector, respectively, for generating the gate signal, said flip-flop being set by the codeword detector signal and being reset by the reset pulse from said timing detector.

4. A monitoring circuit according to claim 1, wherein said monitoring signal generator comprises a retriggerable monostable multivibrator for generating the monitoring signal which has a second predetermined time-period longer than one Time Division Multiple Access data frame.

5. A monitoring circuit according to claim 1, wherein the first pseudo noise sequence generator and said second pseudo noise sequence generator are operatively connected to receive initial data, wherein the first pseudo noise sequence generator and said second pseudo noise sequence generator each comprise:

a shift register having a load input operatively connected to the codeword detector, having a serial input having program terminal inputs for inputting the initial data to be stored in said shift register when said shift register is triggered by the codeword detector signal received at the load input, having intermediate stage outputs and having a last stage output which is also a pseudo noise sequence generator output; and an exclusive-OR gate, having inputs operatively connected to at least one of the intermediate stage outputs and the last stage output of said shift register, and having an output operatively connected to the serial input of said shift register.

6. A monitoring circuit according to claim 1, 2, 3, 4 or 5, wherein said discriminator comprises an exclusive-OR gate.

7. A monitoring circuit, operatively connected to a codeword detector which generates a codeword detector signal, and operatively connected to receive first and second demodulator signals, for a descrambling device, comprising:

a first pseudo noise sequence generator, operatively connected to the codeword detector, for generating a first pseudo noise sequence signal when the codeword detector signal is received;

a second pseudo noise sequence generator, operatively connected to the codeword detector, for generating a second pseudo noise sequence signal when the codeword detector signal is received;

first means, having a first input operatively connected to said first pseudo noise sequence generator and having a second input operatively connected to receive the first demodulator signal, for generating a first data signal from the first pseudo noise sequence signal and the first demodulator signal;

second means, having a first input operatively connected to said first pseudo noise sequence generator and having a second input operatively connected to receive the second demodulator signal, for generating a second data signal from the second pseudo noise sequence signal and the second demodulator signal;

a discriminator, having first and second inputs operatively connected to said first and second pseudo noise sequence generators, respectively, for discriminating between the first and second pseudo noise sequence signals, and for generating a pulse shaped signal when the first and second pseudo noise sequence signals are different;

gate means, having first and second inputs operatively connected to the codeword detector and said discriminator, respectively, for transmitting therethrough the pulse shaped signal when said gate means is operatively activated by the codeword detector signal, said gate means comprising:

a gate signal generator, having an input operatively connected to the codeword detector, and having an output, for generating a gate signal, wherein the time period of the gate signal is a first predetermined time period, after said gate signal is operatively activated by the codeword detector signal; and an AND gate having first and second inputs operatively connected to the output of said gate signal generator and said discriminator, respectively, and having an output; and a monitoring signal generator, operatively connected to the output of said AND gate, for converting the pulse shaped signal into a monitoring signal.

8. A monitoring circuit as recited in claim 7, wherein said monitoring signal generator comprises a retriggerable monostable multi-vibrator for generating the monitoring signal which has a second time period longer than one Time Division Multiple Access data frame.

9. A monitoring circuit as recited in claim 7, wherein said first and second pseudo noise sequence generators are each operatively connected to receive initial data and each comprise:

a shift register having a load input operatively connected to the codeword detector, having a serial input, having program terminal inputs for inputting the initial data to be stored in said shift register when said shift register is operatively activated by the codeword detector signal received at the load input, having intermediate stage outputs and having a last stage output which is also a pseudo noise sequence generator output; and an exclusive OR gate, having inputs operatively connected to at least one of the intermediate stage outputs and the last stage output of said shift register, and having an output operatively connected to the serial input of said shift register.

10. A monitoring circuit as recited in claim 7, wherein said first and second means for generating first and second data signals, respectively, each comprise an exclusive OR gate.

11. A monitoring circuit as recited in claim 7, wherein said discriminator comprises an exclusive OR gate.

12. A monitoring circuit as recited in claim 7, 8, 9, 10 or 11, wherein said gate signal generator is operatively connected to receive clock pulses, wherein said gate signal generator comprises:

a timing counter, having a trigger input operatively connected to the codeword detector, having a clock input and having an output, for counting clock pulses, and for generating a count signal when said timing counter counts a predetermined number of the clock pulses, said timing counter counting being started by the codeword detector signal;

a timing detector, having an input operatively connected to the output of said timing counter, and having an output, for generating a reset pulse when the count signal is received; and a flip-flop having a set input and a reset input operatively connected to the codeword detector and the output of said timing detector, respectively, for generating the gate signal, said flip-flop being set by the codeword detector signal and being reset by the reset pulse from said timing detector.

* * * * *

UNITED STATES PATENT AND TRADEMARK OFFICE
CERTIFICATE OF CORRECTION

PATENT NO. : 4,379,206
DATED : April 5, 1983
INVENTOR(S) : AOKI

It is certified that error appears in the above-identified patent and that said Letters Patent is hereby corrected as shown below:

```
Title page, after line "[22] Filed: Sep. 17, 1980" insert
   --[30] Foreign Application Priority Data
      Sep. 20, 1979 [JP] Japan ....... 54/121183--.
Column 4, line 24, "regrig-" should be --retrig- --;
         line 58, "an" should be --a--;
         line 58, "a" should be --an--.
Column 6, line 28, after "input" insert --,--.
```

Signed and Sealed this

Second Day of August 1983

[SEAL]

Attest:

GERALD J. MOSSINGHOFF

*Attesting Officer*     *Commissioner of Patents and Trademarks*